United States Patent [19]

Buschbaum et al.

[11] 3,896,012

[45] July 22, 1975

[54] ELECTROCHEMICAL METAL-REMOVAL METHOD

[75] Inventors: Edwin Buschbaum; Siegfried Motschmann; Gert Strenge, all of Leipzig, Germany

[73] Assignee: Veb Polygraph Leipzig Kombinat fur Polygraphische Maschinen und Ausrustungen, Leipzig, Germany

[22] Filed: June 27, 1972

[21] Appl. No.: 266,751

[52] U.S. Cl...... 204/129.46; 204/129.1; 204/224 M
[51] Int. Cl............................. B23p 1/00; B23p 1/12
[58] Field of Search..... 204/129.46, 129.1, DIG. 12, 204/224 M, 192.1; 250/542, 544–546

[56] References Cited
UNITED STATES PATENTS

| | | | |
|---|---|---|---|
| 3,338,808 | 8/1967 | Johnson | 204/DIG. 12 |
| 3,385,947 | 5/1968 | Inoue | 204/DIG. 12 |
| 3,476,662 | 11/1969 | Inoue | 204/129.1 |

OTHER PUBLICATIONS

Electrochemical Machining by DeBarr et al., p. 49, pub. by American Elsevier, New York, 1968.

*Primary Examiner*—F. C. Edmundson
*Attorney, Agent, or Firm*—Michael S. Striker

[57] ABSTRACT

A method of electrochemical metal-removal. A metallic work tool having surface high-points and a metallic workpiece are each connected to a different terminal of a source of electrical energy, so that the workpiece and work tool can be used as the anode and cathode, respectively, of an electrolytic reaction. Relative movement is effected between the workpiece and the work tool in a first direction, associated with penetration of the work tool into the workpiece. Relative movement between the workpiece and the work tool is also effected in a second direction transverse to the first direction. An electrolyte is passed between and in contact with the work tool and the workpiece. A current flow is established between the work tool and workpiece and results in oxidation of the metal of the workpiece and the formation of high-points on the surface of the workpiece. At least intermittent contact is permitted between the work tool and the workpiece, in order to effect momentary short-circuits between surface high-points on the work tool and surface high-points on the workpiece.

10 Claims, 14 Drawing Figures

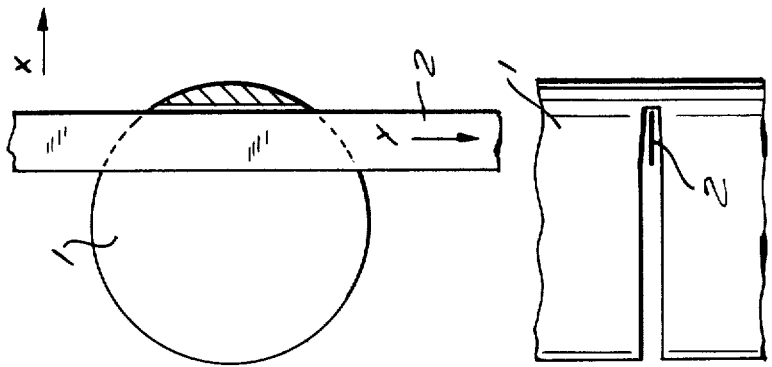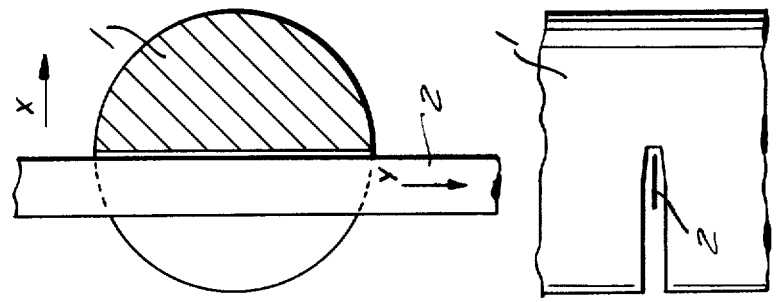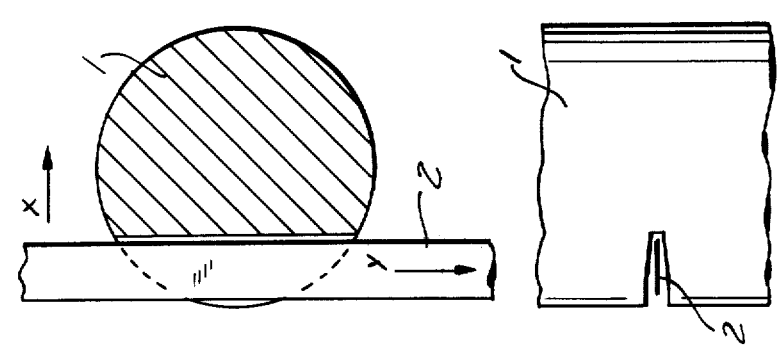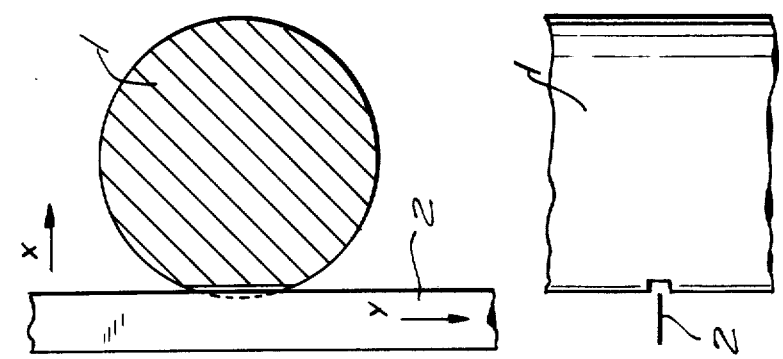

ELECTROCHEMICAL METAL-REMOVAL METHOD

BACKGROUND OF THE INVENTION:

The invention relates to the shaping of workpieces by electrical and electrochemical metal-removal processes.

More particularly, the invention relates to the shaping of a workpiece by an electrochemical process utilizing an external D.C. current source and a flow of electrolyte between the work tool and the workpiece, and is especially concerned with methods of metal-removal wherein slits, bores, and other geometrically regular cavities are formed in metal workpieces.

Two basic methods are known which utilize an external current source for the shaping of a workpiece. One method is the electroerosive metal-removal method, and the other is the electrochemical metal-removal method.

By the electroerosive metal-removal method, the metal removal is effected by means of discharge between the work tool and the workpiece. The discharge can be in the form of a spark-discharge or an arc-discharge. The reaction space between work tool and work piece is filled with a dielectric fluid, which serves to narrow the discharge passage and in that manner increase the energy density of the discharge; in addition, the flow of dielectric fluid serves to cool both work tool and workpiece and to carry away the erosion products. With this method, physical contact between work tool and workpiece was to be avoided, because it would interfere with the creation of the desired spark or arc discharge. Accordingly, the space between work tool and workpiece had to be maintained relatively constant by means of an expensive regulating arrangement. Moreover, the erosion of the work tool itself, as a result of the metal-removal process, could amount to as much as 50% of the volume of metal removed from the workpiece, so that a new work tool would be required for virtually every new workpiece to be shaped. Clearly, the efficiency of such approach is very small, the costs are high, and accordingly the electroerosive metal-removal method is used only when other shaping methods are not possible, for instance when certain metals, such as hardened steel, are being shaped, or when complicated geometric forms are required.

The electrochemical metal-removal method represents a distinct improvement over the electroerosive method. With the electrochemical method, the metal removal is effected by ion exchange between the workpiece to be shaped and the reaction medium. The reaction medium, a conductive electrolyte, is ionized by the voltage between the work tool, which serves as cathode, and the workpiece, which serves as anode. The dissociated molecules of the electrolyte move, under the influence of the electric field, to the electrode having a polarity opposite their own charge polarity. Hydronium ions discharge at the cathode and there liberate hydrogen, and the hydroxyl ions move to the workpiece, lose their charge and there dissolve metal atoms having a valence corresponding to such charge. These dissolved metal atoms react with the hydroxyl ions and form a weakly conducting metal hydroxide compound which is insoluble in the electrolyte. The insoluble metal hydroxide must be carried out by the flowing electrolyte itself, which accordingly must be injected into the reaction zone at very high pressure.

Constituents of the electrolyte which are not themselves changed during the progressing chemical reaction are NaCl and $NaNO_3$ or other similar salts which make possible the ionization, in addition sometimes to chemical substances which hinder the corrosion of the workpiece. The concentration of the electrolyte must from time to time be restored to its initial value. Direct contact between the conductive work tool and the workpiece, which would continually tend to occur if the advancement rate of the work tool were greater than the rate at which metal is removed, must at all costs be avoided with the prior-art method, because in such event the reaction space between work tools and workpiece would be reduced almost to zero, the reaction and thus the metal removal would practically cease, and the continued advancement of the work tool would result in its destruction. For this reason, with the electrochemical method too, expensive control arrangements for governing the advancement of the work tool must be provided, as well as in control arrangements which prevent the occurrence of short circuits between the work tool and workpiece; such known control arrangements disconnect the driving voltage and terminate the forward advancement of the work tool, upon the occurrence of the short circuit.

The electrolyte streaming between the work tool and the workpiece can be considered an ohmic resistance whose magnitude depends primarily on the breadth of the reaction zone between work tool and workpiece as well as on the surface area of the workpiece that actually surrounds the surface of the work tool. With driving voltages of between 5 and 20 volts, which like the work tool advancement rate must be held constant, currents of up to 20,000 amps are conventionally caused to flow. This results in conversion of the electrical energy, to a substantial extent, into heat which increases the temperature of the electrolyte and which necessitates subsequent cooling of the electrolyte, so that the electrolyte will be prevented from vaporizing. The current density, electrolyte path and electrolyte throughput must be so adjusted with respect to one another that at no point along the reaction space is the boiling temperature of the electrolyte solution reached.

During the electrochemical reaction, hydrogen is continually liberated at the cathode, near the work tool, and evolves. Accordingly, the working space during the shaping of the workpiece must be gas-tightly sealed, and a removal by suction of the developed gases must be effected. Moreover, when access is desired to the reaction space between work tool and workpiece, the driving voltage must be switched off by a suitable safety arrangement, in order to prevent the development of a spark which could result in the ignition of the mixture of oxygen and hydrogen present in the reaction space.

Likewise, when the flow of electrolyte and/or the removal by suction of liberated gases is interrupted, switching on of the driving voltage must be prevented; or if already switched on, the driving voltage must be switched off, as a safety measure.

Arrangements for performing such electrochemical metal-removal are extremely expensive, especially because of the requirement for electrolyte pumps with extremely high delivery capabilities, such as are capable of delivering electrolyte at a pressure of 20 atm. or more, so as to simultaneously effect the mechanical removal from the working space of the reaction products resulting from the metal-removal process. An additional problem results from the requirement that the mechanical parts of such electrolyte pumps exhibit a very high chemical resistance, because of the often highly active electrolytes which they must deliver, and this is likewise the case for the heating and cooling arrangements required to control the temperature of the electrolyte.

It is a fact that, even when highly active electrolytes are used, many metals are more economically shaped by entirely mechanical methods, even when fairly complicated geometric forms are desired. With the present state of the art, it is for example not possible or at best very difficult to electrochemically slit steel bodies having a thickness of more than 25 millimeters. The electrochemical method is truly practical only when very complicated geometrical forms are to be executed on hard metal workpieces of very tough steel.

SUMMARY OF THE INVENTION:

Accordingly, it is the general object of the present invention to overcome the disadvantages of the prior art.

It is a more particular object to provide an electrochemical metal-removal method which is applicable to steel bodies of large as well as smaller dimensions.

It is another object to provide an electrochemical metal-removal method which can be economically employed for the shaping of workpieces such as could be easily enough shaped using purely mechanical methods.

It is still a further object to overcome the mechanical disadvantages and complexities of prior-art arrangements for performing the electrochemical metal-removal process.

It is a related object to greatly simplify the mechanical arrangement needed to perform the process.

It is another object to provide a metal-removal method wherein the electrolyte employed need be less highly active than in the prior art, and where accordingly the chemical resistance of the electrolyte pump, and other parts of the mechanical apparatus, need not be so great as heretofore.

It is a further object to provide a metal-removal method according to which the electrolyte need not be injected under high pressure into the reaction zone between work tool and workpiece.

It is another object to provide a metal-removal method wherein the wear on the work tool is no greater than when prior-art methods are used.

These and other objects of the invention are met by a metal-removal method by which a metallic workpiece and a metallic work tool having surface high-points are each connected to a different terminal of a source of electrical energy, so that the workpiece and work tool can be used as the anode and cathode, respectively, of an electrolytic reaction. Relative movement is effected between the work-piece and work tool in a first direction, associated with penetration of the work tool into the workpiece. Relative movement is effected between the workpiece and the work tool in a second direction, also, namely transverse to the first direction. An electrolyte is passed between and in contact with the work tool and the workpiece. A current flow is established between the work tool and the workpiece and results in oxidation of the metal of the workpiece and the formation of high-points on the surface of the workpiece. At least intermittent contact is permitted between the work tool and workpiece, so as to effect momentary short-circuits between surface high-points on the work tool and surface high-points on the workpiece.

The momentary making and breaking of short-circuits between work tool and workpiece results in the development of contact sparks which ignite the oxyhydrogen gas present in the electrolyte near the surface of the workpiece, and accordingly results in intense and localized heating of the workpiece surface.

A splitting off of oxygen occurs in all electrolytic processes, since water is not only split in desired manner into hydronium and hydroxyl ions, but also into elemental hydrogen and oxygen. The oxygen, however, is in general bound to the product of the electrochemical reaction, for example, by conversion of bivalent and trivalent iron into insoluble iron hydroxide. According to the present invention, a sufficient supply of free oxygen is ensured by adding to the electrolyte quantities of chlorate or nitrate, or another such substance, which releases oxygen when reduced. The oxygen released, at least to some extent, is available in elemental form for subsequent combustion with hydrogen; some of such oxygen will be bound in the oxidation products formed during the metal-removal process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING:

FIGS. 4a, 5a, 6a and 7a are a series of horizontal sections showing successive stages of penetration of a workpiece by a work tool;

FIGS. 4b, 5b, 6b and 7b are a series of elevational views corresponding to FIGS. 4a, 5a, 6a and 7a;

Figure 1:
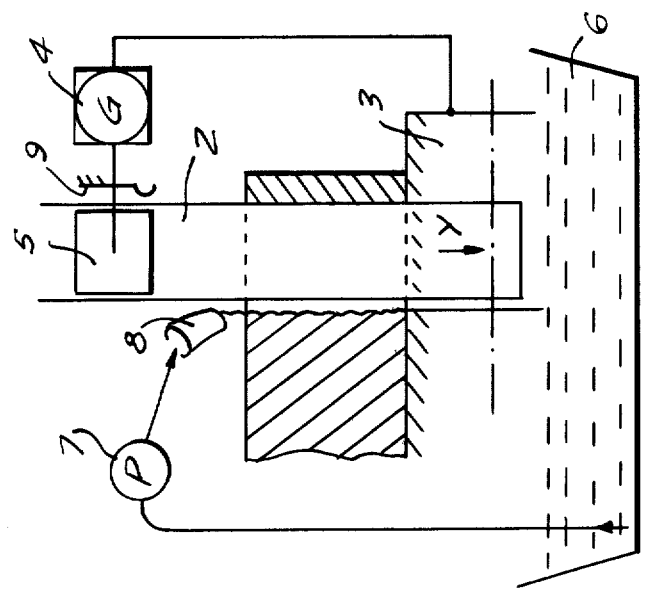
FIG. 1 is a somewhat schematic illustration of an arrangement which performs the type of electrochemical metal-removal process in question.

DESCRIPTION OF THE PREFERRED EMBODIMENTS:

FIG. 1 illustrates somewhat schematically a for the most part a known arrangement for the electrochemical slitting of workpieces, which employs a metallic work tool in the form of an endless driven band 2. A reciprocating band, or a metallic work tool having an entirely different configuration can also be used for performing the invention.

The work table 3, upon which workpiece 1 is slidably mounted, is stationary and forms the anode for the electrochemical reaction. The cathode is formed by driven band 2 which is connected to generator 4 in suitable known manner. In conventional manner, electrolyte is pumped up from an electrolyte reservoir 6 by a pump 7 and is injected by nozzle 8 into the reaction zone between work tool and workpiece.

The arrangements of this type known in the prior art are operative for moving the workpiece 1 in direction X (rightwards in FIG. 1) with a rate of advancement less than the corresponding rate of metal removal, so as to avoid contact between the leading edge of the work tool and the receding edge of the workpiece being slit. In the prior art, complicated regulating and control arrangements are provided for preventing such contact. It is known for example to control the rate of the chemical reaction, by controlling the current density, as a function of the advancement of the work tool, so that if the work tool is advancing at a rate higher than the corresponding rate of metal removal, the current flow will be increased so that the metal will be removed at a rate high enough to prevent contact of work tool and workpiece. Alternatively, such regulating arrangements sometimes effect simple shut-down of the workpiece advancing arrangement and/or switching off of the current supply in response to the occurrence of mechanical contact between the leading edge of the work tool and the receding surface portion of the workpiece.

Figure 3:
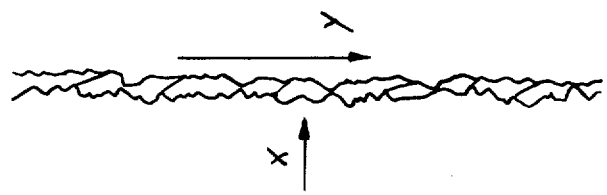
FIG. 3 is an enlarged view of the adjoining surfaces of work tool and workpiece, indicated at A in FIG. 2.
Figure 2:
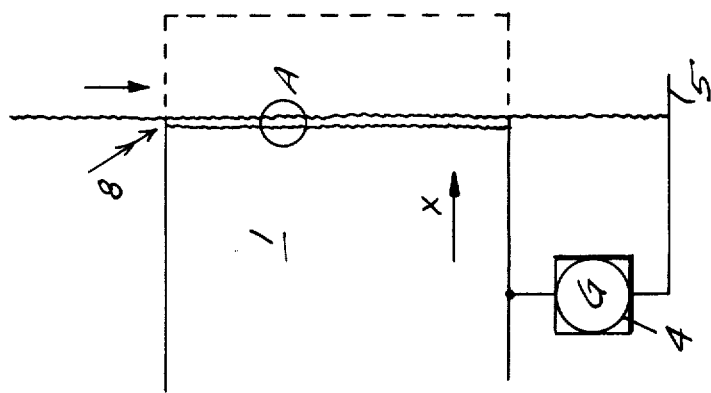
FIG. 2 is a sectional side view of the reaction zone between work tool and workpiece.

The concept of the invention is quite different, and seeks to exploit the existence of surface high-points on the leading edge of the work tool and on the receding surface portion of the workpiece. Such surface roughness, and the existence of a large number of surface high-points, is indicated schematically in FIG. 2, and on a large scale in FIG. 3. It is a fundamental concept of the invention to permit intermittent contact between surface high-points on the work tool and workpiece, so as to permit the creation of momentary short-circuits distributed along the full extent of the reaction zone.

According to the invention, such surface contact should not lead to fusing together of the work tool and workpiece; such fusing is avoided by keeping the contact pressure low, and is furthermore avoided inasmuch as the contact resistance between work tool and workpiece is so great that the short-circuit current flowing is not great enough to hinder an electrochemical reaction.

According to the invention, the short-circuits created are to be kept very short-lasting, so as to result in a continual creation and interruption of short-circuit current at a very large number of locations along the length of the reaction zone. Such creation and interruption of short-circuit current results in contact-breaking sparks which ignite the oxyhydrogen gas generated in the reaction zone during the electrolysis. The oxyhydrogen gas is converted to water, and the reaction liberates a considerable amount of heat in the immediate vicinity of the reacting surface of the workpiece. This results in intense and highly localized heating of such surface. This localized heating serves to soften the surface of the workpiece, and serves also to increase the activity of hydroxyl ions on the exposed workpiece surface. The increase of reaction rate, results in a decrease in the requirement for electrical energy supplied by generator 4, and accordingly is somewhat more economical for this reason. More importantly, however, because the driving current can be decreased, and because the heating effected by the combustion is localized, the electrolyte will be heated to a far lesser extent than conventionally; the consequence of this is a significantly reduced requirement for the cooling of the electrolyte at a subsequent cooling stage.

A further feature of the method of the invention involves the manner of removal of the undissolved oxidation product which forms on the reacting surface of the workpiece. Because the cathodic band 2 is being driven in direction Y during the advance in direction X of the workpiece, the "leading" edge of the work tool itself serves to mechanically carry away the metal-hydroxide oxidation product. In the prior art, which sought to avoid contact between work tool and workpiece, the mechanical removal of the oxidation product was effected by injecting the electrolyte into the reaction zone at very high pressures, for instance on the order of 20 atm and more, so that the flow of electrolyte itself would carry away the oxidation products. According to the invention, however, the electrolyte can be injected into the reaction zone at low or even atmospheric pressure, since it is not called upon to remove the oxidation products. Clearly, this results in a considerable simplification of the apparatus required for performing the method, and accordingly results in an important cost reduction.

Other important advantages follow from the method according to the invention. The rate of penetration of the work tool into the workpiece can be significantly increased, and the height of the reaction zone can be increased, because of the decreased demands made upon the electrolyte. Indeed, in the prior art, the ability of the electrolyte to mechanically carry off the formed oxidation products determined, for the most part, the maximum permissible strength of a metal to be worked upon, the depth of penetration of the work tool, and so forth. These variables are not limited in this manner with the method of the invention.

The invention contemplates the delivery into the reaction zone of smaller amounts of electrolyte than heretofore, for instance by forming the reaction surface of the work tool with minute recesses adapted to retain a certain small amount of electrolyte. When such electrolyte enters the reaction zone, because of the increased temperature and pressure which results in part from the combustion of the hydrogen and oxygen, it will to some extent be forced out of such small recesses.

As already mentioned, conventional apparatus for electrochemical metal-removal incorporate various safety features to forestall damage resulting from contact between the work tool and workpiece. In general, both the application of driving voltage and the forward advancement of the workpiece are terminated in response to any mechanical contact. The removal of the driving voltage is effected to prevent fusing of the work tool to the workpiece, and the halting of workpiece advancement is effected to prevent damage to the work tool and/or to the drive for the advancing means. Such safety mechanisms are quite complicated, because of the need to quickly terminate a flow of current which may be on the order of tens of thousands of amperes. As can be appreciated, the voltage developed across the output inductance of a generator in response to the sudden discontinuance of so high a current is enormous, and accordingly, special safeguarding switching arrangements must be provided to prevent damage to the generator, to the rectifying means, and to other parts of the equipment. Moreover, after the current has been shut off, the work tool must be carefully separated from the workpiece, and a lesser advancement rate for the workpiece must be set. However, this results in the possibility that the advancement rate will now be too low, and the metal-removal rate thus too high, which would lead to metal removal of an imprecise and undesired character.

Needless to point out, the electrochemical reaction between work tool and workpiece occurs not only between the "leading" edge of the work tool and the "receding" edge of the workpiece, but also at the sides of the work tool. Accordingly, the working current is not constant, because a varying fraction of the total current serves to effect the electrochemical reaction at the side flanks of the work tool 2. Thus, the rate of the desired reaction (metal-removal in direction of work tool penetration) also varies, necessitating a variation in the complementary rate at which the workpiece is to be fed towards the work tool. FIGS. 4a to 7a and 4b to 7b help to illustrate this situation.

FIGS. 4a and 4b show the beginning of the slitting of a cylindrical workpiece. The work tool, as before, moves in direction Y while advancing in direction X, and as before the advancement in direction X will usually be effected by actually advancing the workpiece towards the work tool in contrary direction.

From FIGS. 4a and 4b it will be appreciated that at the start of the operation the working current will be at its lowest, and the working voltage at its highest, for a particular operating power, because the small penetration of work tool into workpiece defines a current path having a small crosssectional area, and thus high resistance. Moreover, the predominant fraction of the working current effects metal removal from the workpiece along the desired direction X, so that the rate of advancement of the workpiece towards the work tool can be relatively high.

After a certain time, the work tool has penetrated to the extent indicated in FIGS. 5a and 5b. The working current has increased, inasmuch as the cross-section of the current path, and accordingly its resistance, has decreased, and the working voltage will accordingly have somewhat decreased. Now, however, a greater fraction of the driving current will effect metal removal in direction transverse to the desired direction, resulting to some extent in an undesired broadening of the formed slit. When the position shown in FIGS. 5a and 5b has been reached, the workpiece advancement rate will have been decreased, in order to avoid a hard contact between the leading edge of the work tool and the workpiece.

FIGS. 6a and 6b illustrate a stage of further penetration of the work tool. By now the current flow is at a maximum and the driving voltage at a minimum. As the working current at the leading edge of the work tool begins to decrease, the transverse current flow begins to increase somewhat, and then likewise decreases. In contrast to the situation depicted in FIGS. 4a, 4b and 5a, 5b, the component of current transverse to the working current has increased substantially over such working current, as is still more the case in FIGS. 7a and 7b In view of this steady variation of actual working current relative to the undesired transverse current, the prior art does not regulate the workpiece advancement rate as a direct function of total current flow. Rather, it is more feasible to regulate the advancement rate in a make-or-break fashion, by simply terminating or braking advancement when contact between the leading edge of the work tool and the workpiece has occurred.

The method of the invention permits an optimum control of the workpiece advancement and metal-removal, since contact between work tool and workpiece need not be completely avoided, and is indeed positively required for the generation of contact-breaking sparks which can ignite the oxyhydrogen gas.

Figure 9:
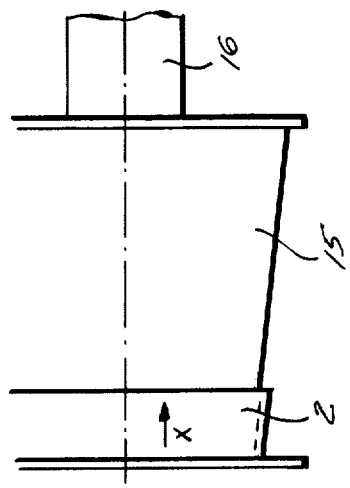
FIG. 9 is a somewhat schematic illustration of an arrangement for positioning and driving a band-shaped work tool.
Figure 8:
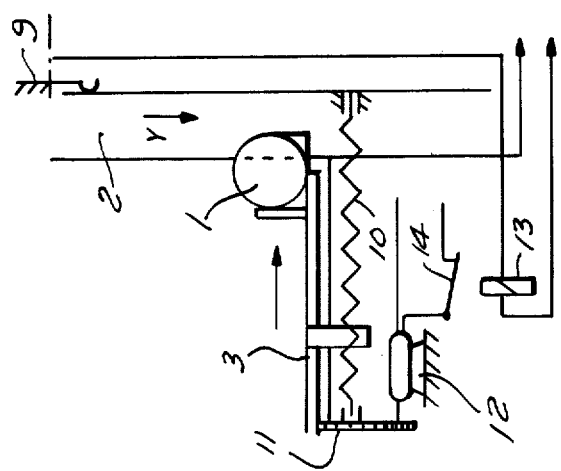
FIG. 8 is a somewhat schematic illustration of an arrangement capable of performing the method according to the invention.

FIG. 8 illustrates a merely exemplary arrangement for performing the method of the invention. The workpiece 1, mounted on a slidable worktable 3, is advanced in direction X towards the driven band 2. An advancement screw-spindle 10, provided with a spindle gear 11, is driven by an advancement motor 12, and enforces movement of worktable 3 with workpiece 1 in direction X. Steel band 2 is either itself somewhat deflectable in direction contrary to workpiece advancement or else yieldably mounted, for instance, as shown in FIG. 9, described below. In this manner, steel band 2 is capable of limited yielding movement in response to contact by the advancing workpiece 1, for instance to the extent of a few millimeters. Such limited range of yielding movement is coordinated with advancement-control contact 9, which cooperates with a relay 13 controlling the switch 14 which connects the motor 12 to power. Such regulating arrangement permits the workpiece to press against the work tool with very slight pressure during the electrochemical metal-removal process.

The operation of such regulating arrangement is self-evident. If the workpiece 1 contacts the work tool 2 and presses thereagainst with more than a predetermined slight pressure, the contact 9 is activated, and the advancement motor is stopped, either disconnected from power, or positively braked in a suitable manner if desired. Whereas in the prior art, at this point, manual separation of the work tool from the workpiece might be required, this is unnecessary with the invention, because the transverse movement in direction Y of steel band 2 is itself sufficient to separate the band 2 from the workpiece 1, if any slight fusion or welding has occurred. Once separation is effected, the flow of electrolyte into the working zone will effect more metal-removal, and when pressure is no longer exerted in contact 9, workpiece advancement will resume. Adjustment of the extent to which band 2 can yield and/or the provision of contrary biasing, permits quite precise control of the permissible pressure that can be exerted by workpiece 1.

FIG. 9 shows, by way of example only, an arrangement for positioning and driving steel band 2 in accordance with the operating principles just explained with regard to FIG. 8.

A drive roller 15, over which the steel band 2 runs, has a somewhat conical configuration, the smaller diameter being in direction towards the advancing workpiece. A second correspondingly configurated, but non-illustrated drive roller is parallel to the roller 15 and positioned under the non-illustrated worktable, so that steel band 2 runs over both rollers 15. By changing the spacing between the roller 15, the stressing of steel band 2 is changed, and so also is its resistance against yielding movement in direction of workpiece advancement.

The invention is not limited to the slitting and splitting of workpieces by means of a lengthwise-moving band, such as band 2. The invention can be practiced in many similar situations, by effecting relative movement between work tool and workpiece in direction transverse to the direction of workpiece advancement, or in direction transverse to work tool advancement, if it is the work tool that advances.

For example, it is known to use prior-art electroerosive and electrochemical metal-removal methods for the formation of cylindrical bores in metallic workpieces. Whereas in the prior art the relative movement is in a single direction, the invention requires relative movement in two transverse directions.

Figure 10:
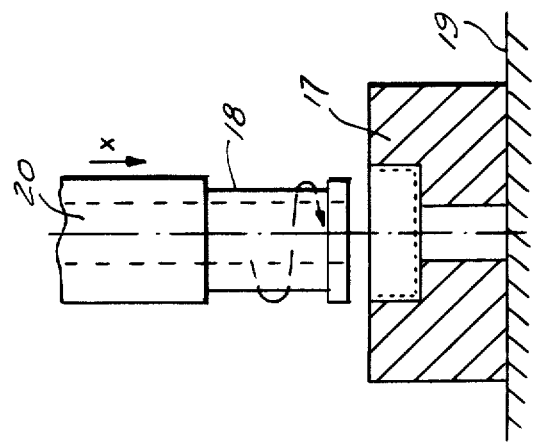
FIG. 10 is a somewhat schematic side view of an arrangement for forming a bore in a metal workpiece by the electrochemical metal-removal process of the invention.

FIG. 10 illustrates, by way of example, a boring operation performed according to the present invention. A workpiece 17 is mounted on a worktable 19, and a borer 18 is rotated above a preliminary bore made into the surface of the workpiece 17. Borer 18 is rotated in direction Y as it descends into and penetrates the workpieces in direction X.

The borer 18 is provided with an electrolyte conduit 20 having an outlet at the leading face of the borer. In FIG. 10, the borer 18 is positioned eccentrically with respect to the axis of the preliminary bore, so as to produce a broader space between the leading part of the borer and the workpiece 17, thereby facilitating outflow of the electrolyte. The inner surface of the bore in workpiece 17 which is marked with dotted lines participates in the electrochemical reaction.

The method of the invention can be performed with any known electrolyte used in electrochemical metal-removal processes. A particularly advantageous electrolyte, whose use results in a shaped workpiece free of burrs and burnt spots and having very little surface roughness, would be a solution including 5 g NaCl, 1–3 g NaClO$_3$ and 10 g NaNO$_3$ per liter of water, and having a density between 1.12 and 1.18 and a pH of between 5 and 2, adjusted by means of an acid, such as for instance phosphoric acid.

It will be understood that each of the elements described above, or two or more together, may also find a useful application in other types of constructions and processes, differing from the types described above.

While the invention has been illustrated and described as embodied in an electrochemical metal-removing process, it is not intended to be limited to the details shown, since various modifications and structural changes may be made without departing in any way from the spirit of the present invention.

Without further analysis, the foregoing will so fully reveal the gist of the present invention that others by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A method of electrochemically removing metal from a workpiece, comprising the steps of connecting a metallic workpiece and a metallic work tool having surface high-points each to a different terminal of a source of electrical energy, so that the workpiece and work tool can be used as the anode and cathode, respectively, of an electrolytic reaction; effecting relative movement between said workpiece and said work tool in a first direction, associated with penetration of said work tool into said workpiece; effecting relative movement between said workpiece and said work tool in a second direction transverse to said first direction; passing an electrolyte between and in contact with said work tool and said workpiece; establishing a current flow between said work tool and said workpiece to effect oxidation of the metal of said workpiece and the generation of hydrogen gas; and establishing continual physical and electrical contact between the work tool and the workpiece to an extent causing the development of momentary short-circuits between surface high-points on said workpiece and said work tool to ignite hydrogen gas in the immediate vicinity of the short-circuiting surface high-points and to effect localized heating and softening of the material of the workpiece in the immediate vicinity of the short-circuiting surface high-points.

2. A method as defined in claim 1, wherein said step of establishing a current flow comprises generating quantities of oxygen and hydrogen, and wherein said step of establishing contact comprises effecting combustion of substantial quantities of such oxygen and hydrogen in the vicinity of said workpiece so as to effect localized heating of said workpiece and softening thereof.

3. A method as defined in claim 1, wherein said oxidation of the metal of said workpiece results in the formation of an undissolved oxidation product on the surface of the workpiece, and wherein said step of establishing physical and electrical contact comprises causing said work tool to mechanically remove said oxidation product from the surface of said workpiece by reason of said continual physical contact between said work tool and said workpiece and by reason of said relative movement between said workpiece and said work tool in said second direction.

4. A method as defined in claim 1, wherein said step of effecting relative movement in a first direction comprises moving said workpiece relative to said work tool.

5. A method as defined in claim 1, wherein said step of effecting relative movement in a second direction comprises moving said work tool relative to said workpiece.

6. A method as defined in claim 1, wherein said step of effecting relative movement in a first direction comprises effecting relative movement between said work tool and said workpiece along a straight path, and wherein said step of effecting relative movement in a second direction comprises effecting relative rotational movement between said work tool and said workpiece.

7. A method as defined in claim 1, wherein said step of passing an electrolyte between said work tool and workpiece comprises injecting an electrolyte at low pressure between said work tool and said workpiece.

8. A method as defined in claim 1, wherein said step of passing an electrolyte between said work tool and said workpiece comprises injecting an electrolyge at substantially atmospheric pressure between said work tool and said workpiece.

9. A method as defined in claim 1, wherein said step of passing an electrolyte between said work tool and said workpiece comprises passing between said work tool and said workpiece an electrolyte which includes an oxygen-containing salt.

10. An arrangement for the electrochemical removal of metal from a workpiece, comprising, in combination, a metallic work tool having surface high-points; means for connecting a metallic workpiece having surface high-points and said work tool each to a different terminal of a source of electrical energy, so that the workpiece and work tool can be used as the anode and cathode, respectively, of an electrochemical reaction; means for effecting relative movement between said workpiece and said work tool in a first direction associated with penetration of said work tool into said workpiece and for simultaneously effecting relative movement between said workpiece and said work tool in a second direction transverse to said first direction; means for passing an electrolyte between and in contact with said work tool and said workpiece; means for establishing a current flow between said work tool and said workpiece to effect oxidation of the metal of said workpiece and the generation of hydrogen gas; and means for establishing continual physical and electrical contact between the work tool and the workpiece to an extent causing the development of momentary short-circuits between surface high-points on said workpiece and said work tool to ignite hydrogen gas in the immediate vicinity of the short-circuiting surface high-points and to effect localized heating and softening of the material of the workpiece in the immediate vicinity of the short-circuiting surface high-points.

* * * * *